(12) United States Patent
Sera et al.

(10) Patent No.: US 11,316,986 B2
(45) Date of Patent: Apr. 26, 2022

(54) SYSTEM FOR CONTROLLING PRINTING IN ASSOCIATION WITH A SOCIAL NETWORKING SERVICE

(71) Applicant: SEIKO EPSON CORPORATION, Tokyo (JP)

(72) Inventors: Takashi Sera, Shiojiri (JP); Hirofumi Miyamoto, Shiojiri (JP); Ryosuke Kakio, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 16/855,382

(22) Filed: Apr. 22, 2020

(65) Prior Publication Data

US 2020/0344364 A1 Oct. 29, 2020

(30) Foreign Application Priority Data

Apr. 24, 2019 (JP) .............................. JP2019-082524

(51) Int. Cl.
*H04N 1/00* (2006.01)
*G06F 3/12* (2006.01)

(52) U.S. Cl.
CPC ....... *H04N 1/00145* (2013.01); *G06F 3/1205* (2013.01); *G06F 3/1267* (2013.01); *G06F 3/1271* (2013.01); *H04N 1/00307* (2013.01)

(58) Field of Classification Search
None
See application file for complete search history.

(56) References Cited

U.S. PATENT DOCUMENTS

| | | | |
|---|---|---|---|
| 2014/0376039 A1* | 12/2014 | Shiratori | G06F 3/1268 358/1.15 |
| 2015/0046556 A1* | 2/2015 | Takenouchi | H04L 67/025 709/207 |
| 2016/0224279 A1* | 8/2016 | Kim | H04L 67/10 |
| 2018/0011724 A1* | 1/2018 | Yoshida | H04N 1/00501 |

FOREIGN PATENT DOCUMENTS

JP 2015-125528 7/2015

* cited by examiner

*Primary Examiner* — Thomas D Lee
(74) *Attorney, Agent, or Firm* — Workman Nydegger (57) ABSTRACT

A second server apparatus that communicates with a printer that performs a print job and a smartphone that executes an application program of an SNS includes an acquisition unit that acquires print instruction information from the SNS, a job generation unit that generates the print job based on the print instruction information acquired by the acquisition unit, a notification unit that notifies the SNS of response information indicating that the print instruction information was accepted and job identification information for identifying the print job, a job transmission unit that transmits the print job to the printer, and a status acquisition unit that acquires status information indicating an execution status of the print job, and the notification unit notifies the SNS of the status information indicating the execution status of the print job acquired by the status acquisition unit and the job identification information.

11 Claims, 5 Drawing Sheets

SYSTEM FOR CONTROLLING PRINTING IN ASSOCIATION WITH A SOCIAL NETWORKING SERVICE

The present application is based on, and claims priority from JP Application Serial Number 2019-082524, filed Apr. 24, 2019, the disclosure of which is hereby incorporated by reference herein in its entirety.

BACKGROUND

1. Technical Field

The present disclosure relates to a data processing system, a data processing method, and a server apparatus.

2. Related Art

A technique in which a terminal device such as a smartphone and a printer are coupled via an SNS server, and the printer is caused to perform a print job in accordance with to the instruction from the terminal device (for example, see JP-A-2015-125528). In an electronic device management system described in JP-A-2015-125528, a printer that can be used by a user, a user terminal operated by the user, and an SNS server that provides an SNS that causes the destination account to receive an SNS message transmitted from the source account are coupled through a network. In addition, the SNS server includes a destination setting unit that regards one of the printer and the user terminal as a source account based on the SNS, and accepts a destination setting for setting the other of the printer and the user terminal as a destination account.

The electronic device management system described in JP A-2015-125528 has a problem that the convenience of the printer management may not be sufficient. For example, when a print job is canceled at the printer, the user who instructed the print job to the printer may not confirm that the print job was canceled.

SUMMARY

According to an aspect of the present disclosure, a data processing system includes a printing apparatus that performs a print job, and a server apparatus that communicates with a terminal device that executes an application program of a social networking service, wherein the server apparatus includes an acquisition unit that acquires a print instruction from the social networking service, a job generation unit that generates a print job corresponding to the printing apparatus based on the print instruction acquired by the acquisition unit, a notification unit that notifies the social networking service of a response indicating that the print instruction was accepted and job identification information for identifying the print job generated by the job generation unit, a job transmission unit that transmits the print job to the printing apparatus, and a status acquisition unit that acquires an execution status of the print job, and wherein the notification unit notifies the social networking service of the execution status of the print job acquired by the status acquisition unit and the job identification information.

According to an aspect of the present of the disclosure, in the data processing system, the terminal device may display a user interface through the social networking service, and the notification unit may transmit, to the social networking service, data for displaying the response and the job identification information in association with each other on the user interface.

According to an aspect of the present of the disclosure, in the data processing system, the notification unit may transmit, to the social networking service, data for displaying the execution status of the print job and the job identification information in association with each other on the user interface.

According to an aspect of the present of the disclosure, in the data processing system, the status acquisition unit may acquire an execution status of the print job including at least one of a cancellation of the print job and completion of the print job, and the notification unit may notify the social networking service of the cancellation of the print job or the completion of the print job together with the job identification information.

According to an aspect of the present of the disclosure, in the data processing system, the notification unit may notify the social networking service of the print instruction for instructing printing on a plurality of sheets in association with one piece of the job identification information.

According to an aspect of the present of the disclosure, in the data processing system, the status acquisition unit may acquire a remaining amount of a printing material consumed by the printing apparatus when printing is performed, and when the remaining amount of the printing material acquired by the status acquisition unit is equal to or less than a threshold value, the notification unit may notify the social networking service that the remaining amount of the printing material is small.

According to an aspect of the present of the disclosure, in the data processing system, when notifying the social networking service that the remaining amount of the printing material is small, the notification unit may make a notification of guiding purchase of the printing material.

According to an aspect of the present of the disclosure, in the data processing system, when the print job is not completed even after a time limit elapsed since the job transmission unit transmitted the print job to the printing apparatus the status acquisition unit may determine that a storage time limit of the print job expired, and the notification unit may make a notification that the storage time limit of the print job expired.

According to an aspect of the present of the disclosure, in the data processing system, the notification unit may accept, from the social networking service, an inquiry request for inquiring about an execution status of the print job corresponding to the job identification information, and notify the social networking service of a response to the inquiry request.

According to another aspect of the present disclosure, in a data processing method performed by a server apparatus that communicates with a printing apparatus that performs a print job and a terminal device that executes an application program of a social networking service, the method includes acquiring a print instruction from the social networking service, generating a print job corresponding to the printing apparatus based on the print instruction, notifying the social networking service of a response indicating that the print instruction was accepted and job identification information for identifying the print job, transmitting the print job to the printing apparatus, acquiring an execution status of the print job, and notifying the social networking service of the execution status of the print job and the job identification information.

According to still another aspect of the present disclosure, in a server apparatus that communicates with a printing apparatus that performs a print job and a terminal device that executes an application program of a social networking service, the server apparatus includes an acquisition unit that acquires a print instruction from the social networking service, a job generation unit that generates a print job corresponding to the printing apparatus based on the print instruction acquired by the acquisition unit, a notification unit that notifies the social networking service of a response indicating that the print instruction was accepted and job identification information for identifying the print job generated by the job generation unit, a job transmission unit that transmits the print job to the printing apparatus, and a status acquisition unit that acquires an execution status of the print job, and wherein the notification unit notifies the social networking service of the execution status of the print job acquired by the status acquisition unit and the job identification information.

DESCRIPTION OF EXEMPLARY EMBODIMENTS

Hereinafter, embodiments will be described with reference to the drawings.

Figure 1:
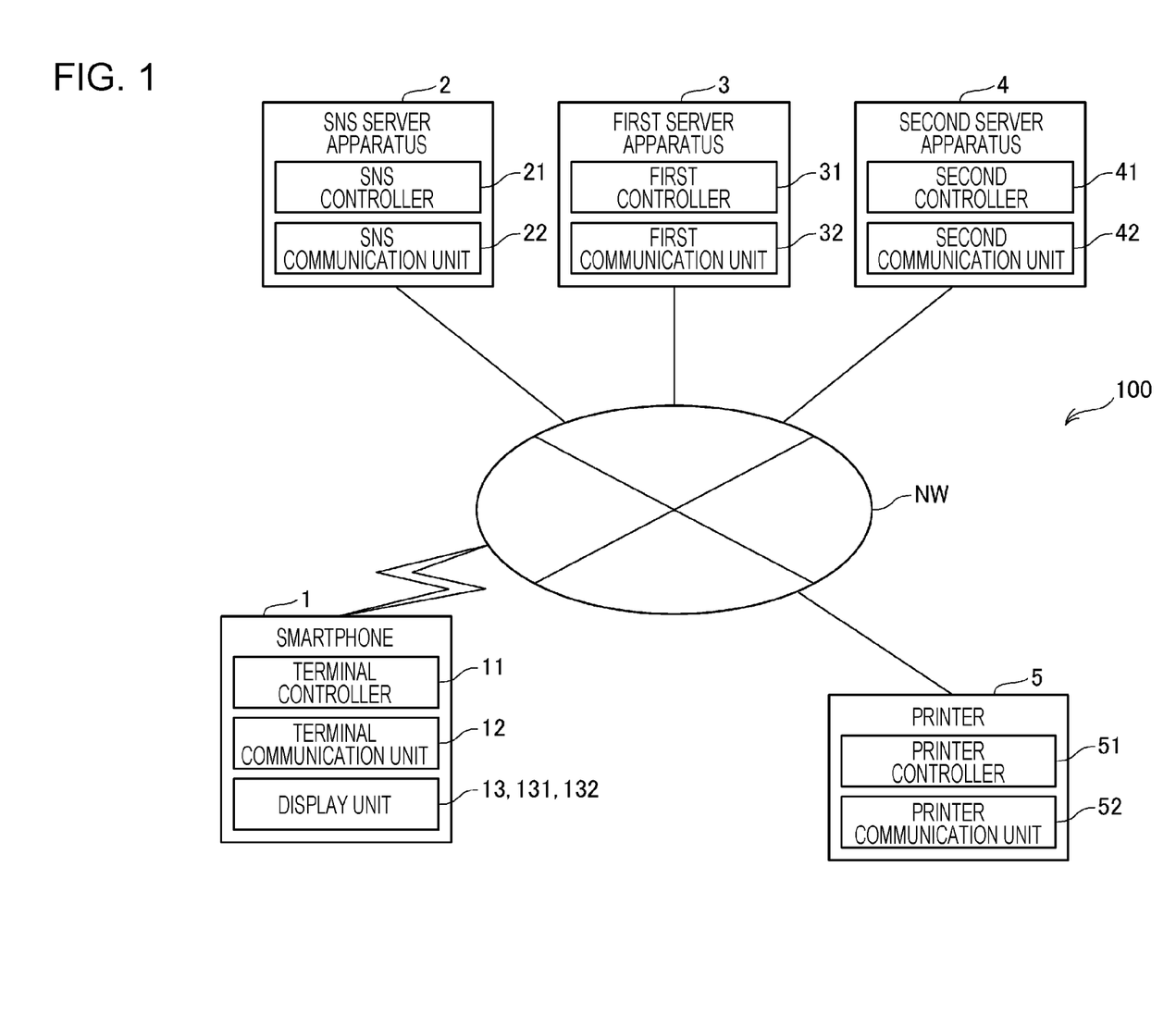
FIG. 1 is a diagram illustrating an example of a configuration of a data processing system.

1. Configuration of Data Processing System 1-1. Overall Configuration of Data Processing System FIG. 1 is a diagram illustrating an example of the configuration of a data processing system 100. As shown in FIG. 1, the data processing system 100 includes a smartphone 1, an SNS server apparatus 2, a first server apparatus 3, a second server apparatus 4, and a printer 5. The smartphone 1 and the SNS server apparatus 2, the first server apparatus 3, the second server apparatus 4, and the printer 5 are communicably coupled to each other via a network NW. The network NW is, for example, the Internet. In the present embodiment, the network NW is the Internet, but embodiments of the present disclosure are not limited to this. The network NW may be a local area network (LAN), or the network NW may be a wide area network (WAN).

The smartphone 1 is coupled to the network NW via a wireless line such as Wi-Fi (registered trademark). The smartphone 1 instructs the printer 5 to perform printing via the SNS server apparatus 2, the first server apparatus 3, and the second server apparatus 4 in succession. The smartphone 1 corresponds to an example of a "terminal device". The smartphone 1 includes a terminal controller 11, a terminal communication unit 12, and a display unit 13.

The terminal controller 11 includes a processor such as a central processing unit (CPU) and a microcomputer, and controls respective units of the smartphone 1 by causing the processor to execute the control program. The terminal controller 11 includes a memory such as a read only memory (ROM) that stores a control program executed by the processor in a nonvolatile manner and a random access memory (RAM) that configures a work area of the processor.

The terminal communication unit 12 is a communication interface that performs data communication with an external device. The terminal communication unit 12 may be a wired communication interface to which a cable can be coupled, or a wireless communication interface. For example, a wired LAN interface corresponding to Ethernet (registered trademark), or a wireless LAN interface corresponding to the IEEE 802.11 standard may be used. For example, the terminal communication unit 12 is a communication interface that couples to the SNS server apparatus 2 via a wireless line such as Wi-Fi (registered trademark).

The display unit 13 includes a display panel 131 and a touch sensor 132. Each of the display panel 131 and the touch sensor 132 is coupled to the terminal controller 11. The display panel 131 displays various images based on the control of the terminal controller 11. The display panel 131 is composed of, for example, a liquid crystal display (LCD). The touch sensor 132 detects a user's touch operation and outputs data indicating the detected operation to the terminal controller 11. The touch sensor 132 is formed integrally with the display panel 131. Specifically, the touch sensor 132 is formed on the image display surface of the display panel 131.

The social networking service (SNS) server apparatus 2 performs an SNS. The SNS is, for example, LINE (registered trademark). For example, the SNS server apparatus 2 exchanges messages with the smartphone 1. Specifically, the SNS server apparatus 2 accepts print instruction information JA from the smartphone 1 to the printer 5. In addition, the SNS server apparatus 2 transports, to the first server apparatus 3, the print instruction information JA to the printer 5 accepted from the smartphone 1. The print instruction information JA indicates the contents of an instruction regarding printing to the printer 5. The print instruction information JA corresponds to an example of a "print instruction". The SNS server apparatus 2 includes an SNS controller 21 and an SNS communication unit 22.

The SNS controller 21 includes a processor such as a CPU and a microcomputer, and controls respective units of the SNS server apparatus 2 by causing the processor to execute the control program. The SNS controller 21 includes a memory such as a ROM that stores a control program executed by the processor in a nonvolatile manner and a RAM that configures a work area of the processor, and a hard disk drive (HDD).

The SNS communication unit 22 is a communication interface that performs data communication with an external device. The SNS communication unit 22 may be a wired communication interface to which a cable can be coupled or a wireless communication interface. For example, a wired LAN interface corresponding to Ethernet (registered trademark), or a wireless LAN interface corresponding to the IEEE 802.11 standard may be used. The SNS communication unit 22 is, for example, a wired LAN interface corresponding to Ethernet (registered trademark).

The first server apparatus 3 communicates with each of the SNS server apparatus 2 and the second server apparatus 4. For example, the first server apparatus 3 accepts the print instruction information JA to the printer 5 from the SNS server apparatus 2 and transports, to the second server apparatus 4, the print instruction information JA to the printer 5. The first server apparatus 3 includes a first controller 31 and a first communication unit 32.

The first controller 31 has substantially the same configuration as the SNS controller 21. The first communication unit 32 has substantially the same configuration as the SNS communication unit 22.

The second server apparatus 4 communicates with each of the first server apparatus 3 and the printer 5. For example, the second server apparatus 4 accepts the print instruction information JA to the printer 5 from the second server apparatus 4, and submit a print job to the printer 5. The second server apparatus 4 includes a second controller 41 and a second communication unit 42. The second server apparatus 4 corresponds to an example of a "server apparatus".

The second controller 41 has substantially the same configuration as the SNS controller 21. The second communication unit 42 has substantially the same configuration as the SNS communication unit 22.

The printer 5 receives a print job from the second server apparatus 4, and performs the received print job. The printer 5 is, for example, an ink jet printer. The printer 5 corresponds to an example of a "printing apparatus". The printer 5 includes a printer controller 51 and a printer communication unit 52. In the present embodiment, the printer 5 is an ink jet printer, but the embodiment of the present disclosure is not limited to this. The printer 5 may be a dot impact printer or a laser printer.

The printer controller 51 includes a processor such as a CPU and a microcomputer, and controls respective units of the printer 5 by causing the processor to execute the control program. The printer controller 51 includes a memory such as a ROM that stores a control program executed by the processor in a nonvolatile manner and a RAM that configures a work area of the processor, and an HDD.

The printer communication unit 52 is a communication interface that performs data communication with the second server apparatus 4. The printer communication unit 52 may be a wired communication interface to which a cable can be coupled, or may be a wireless communication interface. For example, a wired LAN interface corresponding to Ethernet (registered trademark), or a wireless LAN interface corresponding to the IEEE 802.11 standard may be used. The printer communication unit 52 is a wired LAN interface corresponding to Ethernet (registered trademark), for example.

1-2. Functional Configuration of Smartphone

Figure 2:
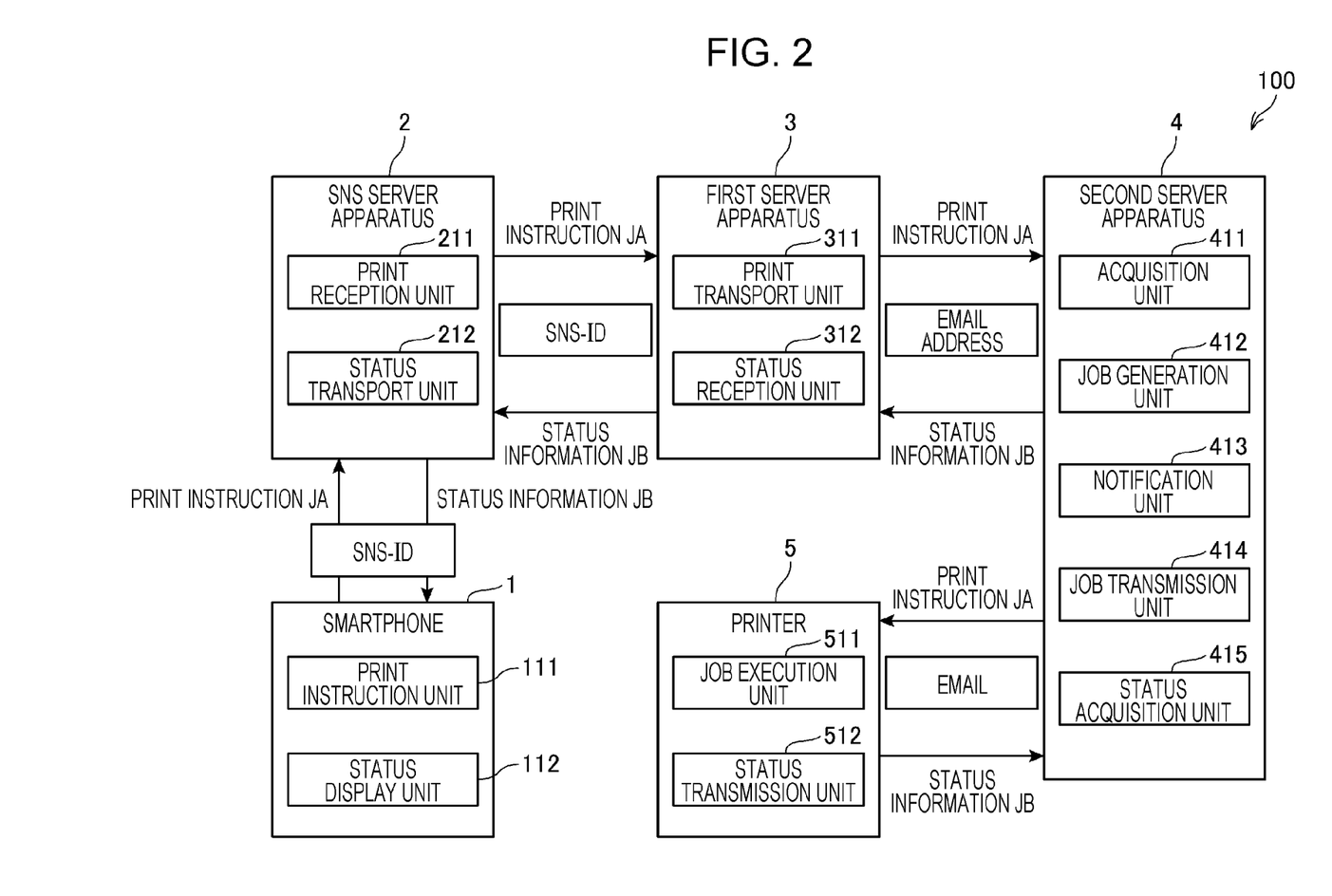
FIG. 2 is a diagram illustrating an example of a functional configuration of a data processing system.

FIG. 2 is a diagram illustrating an example of a functional configuration of the data processing system 100. As shown in FIG. 2, the terminal controller 11 of the smartphone 1 includes a print instruction unit 111 and a status display unit 112. Specifically, when the processor of the terminal controller 11 of the smartphone 1 executes the application program, the terminal controller 11 functions as the print instruction unit 111 and the status display unit 112. The application program is, for example, a LINE application. In addition, when the processor of the terminal controller 11 executes the application program of the social networking service, a message screen as a user interface is displayed on the display panel 131. The message screen will be described in detail later with reference to FIG. 3.

The print instruction unit 111 accepts the print instruction information JA for the printer 5 from the user via the message screen on the display panel 131. In addition, the print instruction unit 111 transmits the accepted print instruction information JA for the printer 5 to the SNS server apparatus 2. The print instruction information JA includes print data. The print data indicates data printed by the printer 5. The print data may be image data such as a photo or text data such as document data.

The status display unit 112 accepts status information JB from the SNS server apparatus 2 and displays the status information JB on the message screen of the display panel 131. The status information JB indicates the status of the printer 5.

Communication between the smartphone 1 and the SNS server apparatus 2 is performed using an SNS-ID. The SNS-ID indicates user identification information in the SNS server apparatus 2. The SNS-ID is, for example, a LINE-ID. That is, the print instruction information JA is transmitted from the smartphone 1 to the SNS server apparatus 2 in association with the SNS-ID. The status information JB is transmitted from the SNS server apparatus 2 to the smartphone 1 in association with the SNS-ID.

The status information JB includes, specifically, small remaining amount information JB1, print cancellation information JB2, storage period expiration information JB3, partial completion information JB4, entire completion information JB5, and incompletion information JB6.

The small remaining amount information JB1 indicates that the printer 5 has a small remaining amount of the printing material. The printing material indicates a material consumed by the printer 5 during printing. For example, the printing material is a printing medium such as ink, toner or paper. The small remaining amount information JB1 includes information for guiding the purchase of the printing material. The information for guiding the purchase of the printing material is, for example, link information JL to the home page of the ink purchase destination.

The print cancellation information JB2 indicates that a print job PB corresponding to the print instruction information JA has been cancelled.

The storage period expiration information JB3 indicates that the storage time limit of the print job PB corresponding to the print instruction information JA has expired. The storage time limit is 72 hours, for example.

The partial completion information JB4 indicates that part of the print job PB corresponding to the print instruction information JA has been completed. For example, when the print job PB is a job of performing printing on five sheets, the partial completion information JB4 indicates that printing one to four sheets has been completed. That is, the partial completion information JB4 includes information indicating that printing on one sheet has been completed, information indicating that printing on two sheets has been completed, information indicating that printing on three sheets has been completed, and information indicating that printing on four sheets has been completed.

The entire completion information JB5 indicates that the entire print job PB corresponding to the print instruction information JA has been completed. For example, when the print job PB is a job of performing printing on five sheets, the entire completion information JB5 indicates that printing five sheets has been completed.

The incompletion information JB6 indicates that the print job PB corresponding to the print instruction information JA has not been completed at all. For example, when the print job PB is a job of performing printing on five sheets, the incompletion information JB6 indicates that printing on none of five sheets has been completed.

1-3. Functional Configuration of SNS Server Apparatus and First Server Apparatus As shown in FIG. 2, the SNS controller 21 of the SNS server apparatus 2 includes a print reception unit 211 and a status transport unit 212. Specifically, when the processor of the SNS controller 21 of the SNS server apparatus 2 executes the control program, the SNS controller 21 functions as the print reception unit 211 and the status transport unit 212.

The print reception unit 211 receives the print instruction information JA accepted by the print instruction unit 111 and transports the received print instruction information JA to the first server apparatus 3.

The status transport unit 212 receives the status information JB from the first server apparatus 3 and transports the received status information JB to the smartphone 1.

Communication between the SNS server apparatus 2 and the first server apparatus 3 is performed using an SNS-ID.

Specifically, the print instruction information JA is transported from the SNS server apparatus 2 to the first server apparatus 3 in association with the SNS-ID. The status information JB is transported from the first server apparatus 3 to the SNS server apparatus 2 in association with the SNS-ID.

The first controller 31 of the first server apparatus 3 includes a print transport unit 311 and a status reception unit 312. Specifically, when the processor of the first controller 31 of the first server apparatus 3 executes the control program, the first controller 31 functions as the print transport unit 311 and the status reception unit 312. The HDD of the first controller 31 of the first server apparatus 3 stores the SNS-ID and the email address in association with each other. The email address is the email address of the printer 5. In the present embodiment, the HDD of the first controller 31 stores the SNS-ID and the email address in association with each other, but the embodiment of the present disclosure is not limited to this. The memory of the first controller 31 may store the SNS-ID and the email address in association with each other.

The print transport unit 311 receives the print instruction information JA from the SNS server apparatus 2 and transports the received print instruction information JA to the second server apparatus 4.

The status reception unit 312 receives the status information JB from the second server apparatus 4 and transports the received status information JB to the SNS server apparatus 2.

Communication between the first server apparatus 3 and the second server apparatus 4 is performed using an email address. Specifically, the print instruction information JA is transported from the first server apparatus 3 to the second server apparatus 4 in association with the email address. The status information JB is transported from the second server apparatus 4 to the first server apparatus 3 in association with the email address.

1-4. Functional Configuration of Second Server Apparatus

The second controller 41 of the second server apparatus 4 includes an acquisition unit 411, a job generation unit 412, a notification unit 413, a job transmission unit 414 and, a status acquisition unit 415. Specifically, when the processor of the second controller 41 of the second server apparatus 4 executes the control program, the second controller 41 functions as the acquisition unit 411, the job generation unit 412, the notification unit 413, the job transmission unit 414, and the status acquisition unit 415.

The acquisition unit 411 acquires the print instruction information JA from a social networking service (hereinafter abbreviated as SNS). Note that "social networking service" is abbreviated as "SNS" in the following description. Specifically, the acquisition unit 411 acquires the print instruction information JA from the smartphone 1 via the SNS server apparatus 2 and the first server apparatus 3 in succession. That is, the acquisition unit 411 acquires the print instruction information JA from the SNS server apparatus 2. In other words, "acquire from the SNS" indicates "acquire from the SNS server apparatus 2".

The job generation unit 412 generates the print job PB corresponding to the printer 5 based on the print instruction information JA acquired by the acquisition unit 411.

The notification unit 413 notifies the SNS of response information JR indicating that the print instruction information JA has been accepted and job identification information PID. The job identification information PID indicates information for identifying the print job PB. Specifically, the notification unit 413 notifies the smartphone 1 of the response information JR and the job identification information PID via the first server apparatus 3 and the SNS server apparatus 2 in succession. That is, the notification unit 413 notifies the SNS server apparatus 2 of the response information JR and the job identification information PID. In other words, "make a notification to the SNS" indicates "make a notification to the SNS server apparatus 2".

In addition, the notification unit 413 transmits, to the SNS, data for displaying the response information JR and the job identification information PID in association with each other on the user interface. In addition, the notification unit 413 notifies the SNS of the status information JB indicating the execution status of the print job PB acquired by the status acquisition unit 415 and the job identification information PID.

The job transmission unit 414 transmits the print job PB generated by the job generation unit 412 to the printer 5.

The status acquisition unit 415 acquires the execution status of the print job PB. Specifically, the status acquisition unit 415 acquires the status information JB indicating the execution status of the print job PB including at least one of the cancellation of the print job PB and the completion of the print job PB.

The notification unit 413 notifies the SNS of the cancellation of a print job JB or the completion of the print job JB together with the job identification information PID based on the status information JB acquired by the status acquisition unit 415. Specifically, when the status acquisition unit 415 acquires the print cancellation information JB2, the notification unit 413 notifies the SNS of the print cancellation information JB2 together with the job identification information PID. When the status acquisition unit 415 acquires the partial completion information JB4, the notification unit 413 notifies the SNS of the partial completion information JB4 together with the job identification information PID. When the status acquisition unit 415 acquires the entire completion information JB5, the notification unit 413 notifies the SNS of the entire completion information JB5 together with the job identification information PID.

Further, the status acquisition unit 415 acquires the remaining amount of the printing material consumed by the printer 5 when performing printing. Specifically, the status acquisition unit 415 acquires remaining amount information JQ from the printer 5. The remaining amount information JQ indicates the remaining amount of the printing material consumed by the printer 5 when performing printing. For example, the remaining amount information JQ indicates the remaining amount of ink.

In addition, the notification unit 413 notifies the SNS that the remaining amount of the printing material is small when the remaining amount of the printing material acquired by the status acquisition unit 415 is equal to or less than a threshold value. Specifically, the notification unit 413 notifies the SNS of the small remaining amount information JB1 when a remaining amount Q indicated by the remaining amount information JQ is equal to or less than a threshold value QS. In addition, when notifying the SNS that the remaining amount of the printing material is small, the notification unit 413 makes notification of guiding the purchase of the printing material. For example, the small remaining amount information JB1 includes the link information JL to the home page of the ink purchase destination.

Further, the status acquisition unit 415 determines that the storage time limit of the print job PB has expired when the print job PB has not been completed even after the time limit has elapsed since the job transmission unit 414 transmitted the print job PB to the printer 5. The time limit is, for example, 72 hours. The storage time limit is, for example, 72 hours.

In addition, when the status acquisition unit 415 determines that the storage time limit of the print job PB has expired, the notification unit 413 make a notification that the storage time limit of the print job has expired. Specifically, the notification unit 413 notifies the SNS of the storage period expiration information JB3 together with the job identification information PID.

In addition, the notification unit 413 accepts, from the SNS, an inquiry request RQ of inquiring about the execution status of the print job PB corresponding to the job identification information PID, and notifies the SNS of a response to the inquiry request RQ. Specifically, the notification unit 413 accepts the inquiry request RQ via the SNS server apparatus 2 and the first server apparatus 3 in succession. In addition, the notification unit 413 sends the inquiry request RQ to the printer 5, and acquires a response to the inquiry request RQ from the printer 5. The response to the inquiry request RQ is notified to the smartphone 1 via the first server apparatus 3 and the SNS server apparatus 2 in succession. The response to the inquiry request RQ is the partial completion information JB4, the entire completion information JB5, or the incompletion information JB6.

1-5. Functional Configuration of Printer

The printer controller 51 of the printer 5 includes a job execution unit 511 and a status transmission unit 512. Specifically, when the processor of the printer controller 51 of the printer 5 executes the control program, the printer controller 51 functions as the job execution unit 511 and the status transmission unit 512.

The job execution unit 511 performs the print job PB transmitted from the job transmission unit 414.

The status transmission unit 512 generates the status information JB of the printer 5 and transmits the status information JB to the second server apparatus 4. When accepting the inquiry request RQ from the notification unit 413, the status transmission unit 512 generates the status information JB of the printer 5, and transmits the status information JB to the second server apparatus 4.

2. Screen to Display on Smartphone

Figure 3:
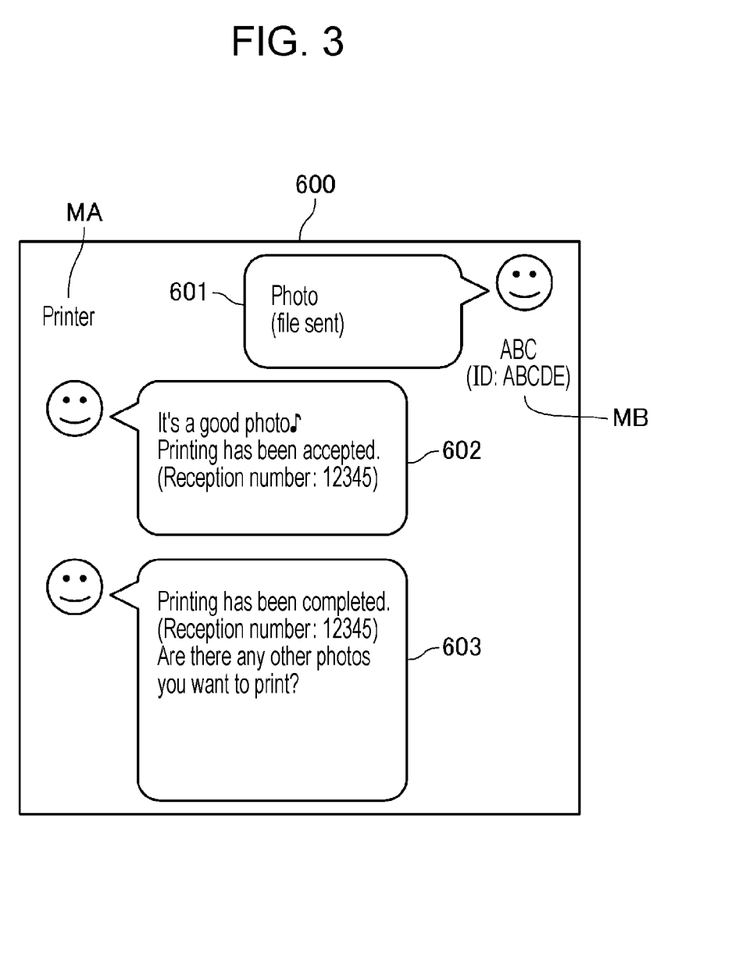
FIG. 3 is a screen diagram illustrating an example of a message screen displayed on a display unit of a smartphone.

FIG. 3 is a screen diagram illustrating an example of a message screen 600 displayed on the display unit 13 of the smartphone 1. The message screen 600 corresponds to an example of the "user interface". As shown in FIG. 3, a printer mark MA, a user mark MB, a first message 601, a second message 602, and a third message 603 are displayed on the message screen 600.

The printer mark MA indicates that the message on the left side in the message screen 600 is virtually input from the printer 5. The user mark MB indicates that the message on the right side of the message screen 600 is input by the user. The user mark MB includes "ABC (ID: ABCDE)", which indicates that the username is "ABC" and the user's SNS-ID is "ABCDE".

The first message 601 is displayed as a balloon from the right side, which indicates that the user has input the first message 601. In addition, the first message 601 includes "Photo (file sent)", which indicates that the user has input a print instruction to print the "photo" as the attached file. Although FIG. 3 illustrates a case where one "photo" as the attached file is printed, the print instruction may be such that a plurality of "photos" as the attached file is printed. In addition, although FIG. 3 illustrates a case where one sheet of "photo" as the attached file is printed, there is a plurality of "photos" in the attachment, and the print instruction may be such that the plurality of photos is printed one by one.

The second message 602 is displayed as a balloon from the left side, which indicates that the second message 602 is virtually input from the printer 5. In addition, the second message 602 includes "It's a good photo Printing has been accepted. (Reception number: 12345)", which indicates that a photo print instruction from the user is accepted, and the reception number is "12345". The reception number corresponds to, for example, the job identification information PID. In FIG. 3, the print instruction to print one "photo" as the attached file corresponds to the job identification information PID, but the embodiment of the present disclosure is not limited to this. The print instruction to print a plurality of sheets may correspond to the job identification information PID. For example, a print instruction to print five sheets may correspond to the job identification information PID.

The notification unit 413 of the second server apparatus 4 transmits, to the smartphone 1, data for displaying the response information JR and the job identification information PID in association with each other on the message screen 600, and when the smartphone 1 accepts this data, the second message 602 is displayed.

The third message 603 is displayed as a balloon from the left side, which indicates that the third message 603 is virtually input from the printer 5. In addition, the third message 603 includes "Printing has been completed (Reception number: 12345). Are there any other photos you want to print?", which indicates that the print job PB corresponding to the reception number "12345" has been completed.

When the status acquisition unit 415 of the second server apparatus 4 acquires the entire completion information JB5, the notification unit 413 notifies the smartphone 1 of the entire completion information JB5 together with the job identification information PID. When the status display unit 112 of the smartphone 1 accepts the entire completion information JB5 and the job identification information PID, the third message 603 is displayed by the status display unit 112.

3. Process of Second Controller of Second Server Apparatus

Figure 4:
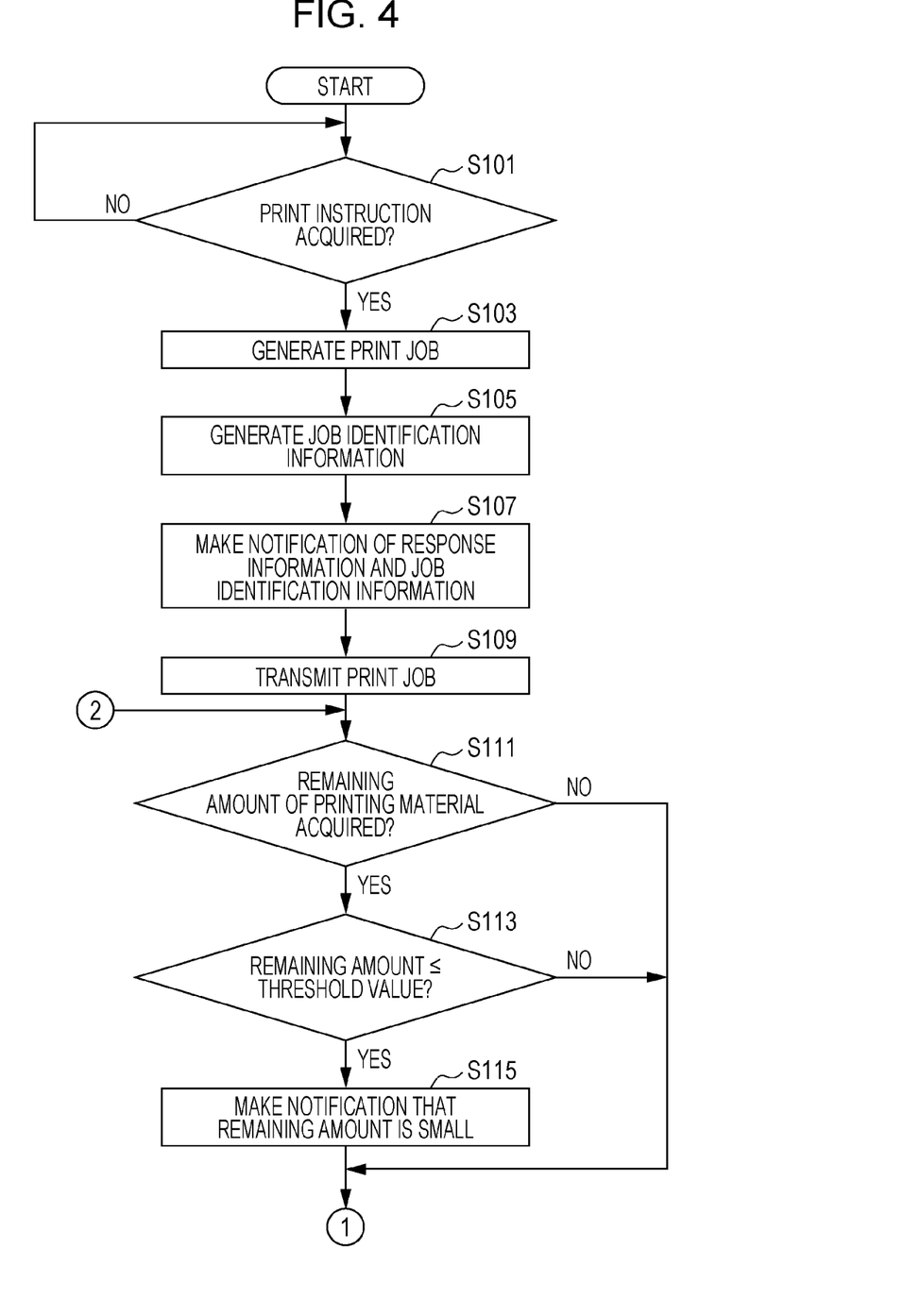
FIG. 4 is a flowchart illustrating an example of a process of a second controller of a second server apparatus.
Figure 5:
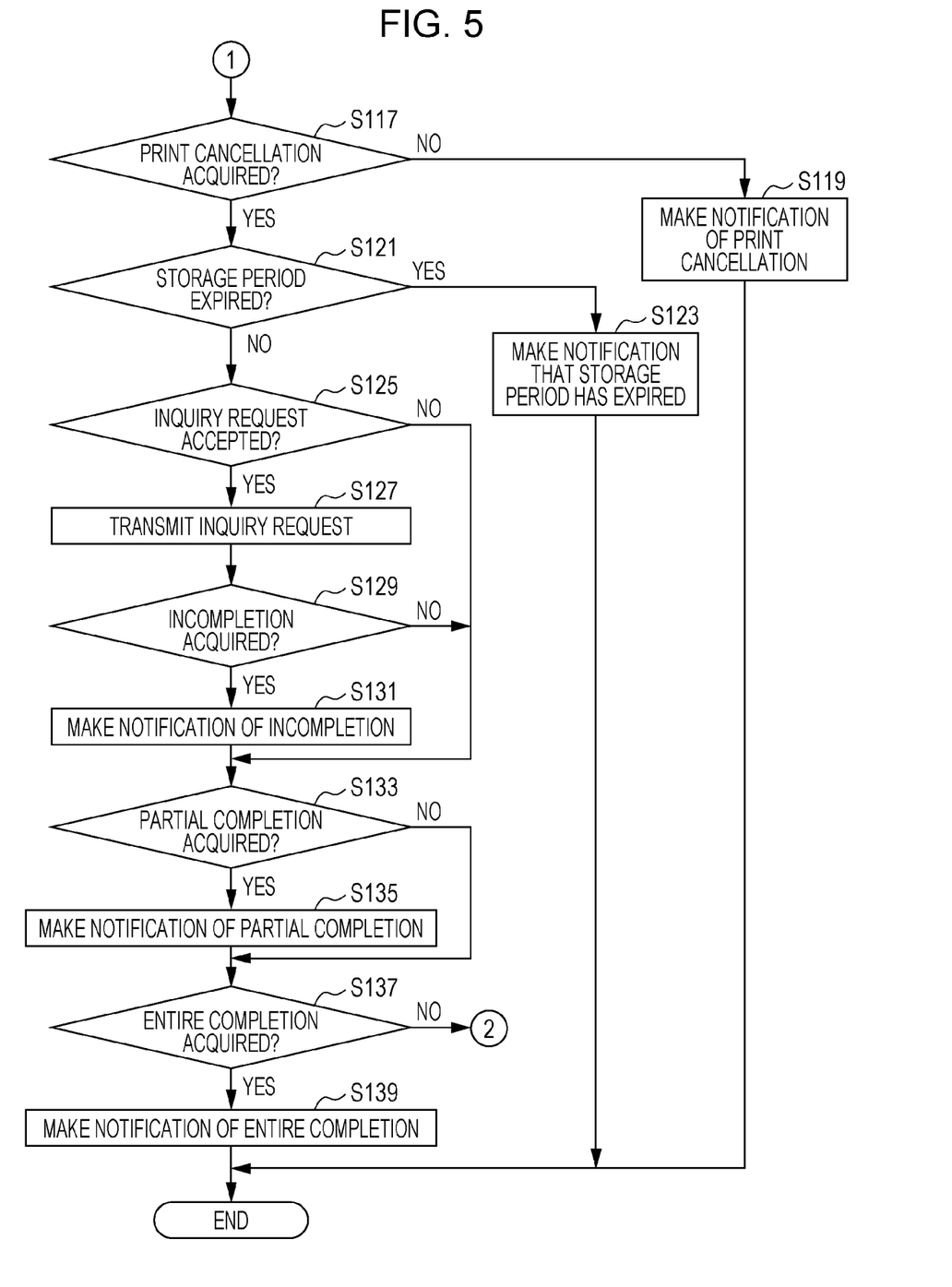
FIG. 5 is a flowchart showing an example of a process of the second controller of the second server apparatus.

Each of FIG. 4 and FIG. 5 is a flowchart illustrating an example of a process of the second controller 41 of the second server apparatus 4. First, as illustrated in FIG. 4, in step S101, the acquisition unit 411 determines whether the print instruction information JA has been acquired from the smartphone 1. When the acquisition unit 411 determines that the print instruction information JA has not been acquired from the smartphone 1 (step S101; NO), the process proceed to a standby state. When the acquisition unit 411 determines that the print instruction information JA has been acquired from the smartphone 1 (step S101; YES), the process proceeds to step S103. In step S103, the job generation unit 412 generates the print job PB corresponding to the printer 5 based on the print instruction information JA acquired by the acquisition unit 411.

Next, in step S105, the notification unit 413 generates the job identification information PID indicating the print job PB. Next, in step S107, the notification unit 413 notifies the smartphone 1 of the response information JR indicating that the print instruction information JA has been accepted and the job identification information PID. Next, in step S109, the job transmission unit 414 transmits the print job PB to the printer 5.

Next, in step S111, the status acquisition unit 415 determines whether the remaining amount information JQ of the printing material (for example, ink) has been acquired. When the status acquisition unit 415 determines that the remaining amount information JQ of the printing material has not been acquired (step S111; NO), the process proceeds to step S117 in FIG. 5. When the status acquisition unit 415 determines that the remaining amount information JQ of the printing material has been acquired (step S111; YES), the process proceeds to step S113. Then, in step S113, the notification unit 413 determines whether the remaining amount Q is equal to or less than the threshold value QS. When the notification unit 413 determines that the remaining amount Q is more than the threshold value QS (step S113; NO), the process proceeds to step S117 in FIG. 5. When the notification unit 413 determines that the remaining amount Q is equal to or less than the threshold value QS (step S113; YES), the process proceeds to step S115. In step S115, the notification unit 413 notifies the smartphone 1 of the small remaining amount information JB1.

Next, as shown in FIG. 5, in step S117, the status acquisition unit 415 determines whether the print cancellation information JB2 has been acquired. When the status acquisition unit 415 determines that the status acquisition unit 415 has acquired the print cancellation information JB2 (step S117; YES), the process proceeds to step S119. In step S119, the notification unit 413 notifies the smartphone 1 of the print cancellation information JB2 together with the job identification information PID, and the process ends. When the status acquisition unit 415 determines that the status acquisition unit 415 has not acquired the print cancellation information JB2 (step S117; NO), the process proceeds to step S121. In step S121, the status acquisition unit 415 determines whether the storage time limit of the print job PB has expired. Specifically, when the print job PB is not completed even after the time limit has elapsed since the job transmission unit 414 transmitted the print job PB to the printer 5, the status acquisition unit 415 determines that the storage time limit of the print job PB has expired.

When the status acquisition unit 415 determines that the storage time limit of the print job PB has expired (step S121; YES), the process proceeds to step S123. In step S123, the second controller 41 instructs the printer 5 to delete the print job PB, the notification unit 413 notifies the smartphone 1 of the storage period expiration information JB3 together with the job identification information PID, and the process ends. When the status acquisition unit 415 determines that the storage time limit of the print job PB has not expired (step S121; NO), the process proceeds to step S125. In step S125, the status acquisition unit 415 determines whether the inquiry request RQ from the SNS has been accepted. When the status acquisition unit 415 determines that the inquiry request RQ has not been accepted (step S125; NO), the process proceeds to step S133. When the status acquisition unit 415 determines that the inquiry request RQ has been accepted (step S125; YES), the process proceeds to step S125. In step S127, the status acquisition unit 415 transmits the inquiry request RQ to the printer 5.

Next, in step S129, the status acquisition unit 415 determines whether the incompletion information JB6 as a response to the inquiry request RQ has been acquired from the printer 5. When the status acquisition unit 415 determines that the incompletion information JB6 has not been acquired (step S129; NO), the process proceeds to step S133. When the status acquisition unit 415 determines that the incompletion information JB6 has been acquired (step S129; NO), the process proceeds to step S131. In step S131, the status acquisition unit 415 notifies the smartphone 1 of the incompletion information JB6 together with the job identification information PID.

Next, in step S133, the status acquisition unit 415 determines whether the partial completion information JB4 has been acquired. When the status acquisition unit 415 determines that the partial completion information JB4 has not been acquired (step S133; NO), the process proceeds to step S137. When the status acquisition unit 415 determines that the partial completion information JB4 has been acquired (step S133; YES), the process proceeds to step S135. In step S135, the notification unit 413 notifies the smartphone 1 of the partial completion information JB4 together with the job identification information PID.

Next, in step S137, the status acquisition unit 415 determines whether the entire completion information JB5 has been acquired. When the status acquisition unit 415 determines that the entire completion information JB5 has not been acquired (step S137; NO), the process returns to step S111 in FIG. 4. When the status acquisition unit 415 determines that the entire completion information JB5 has been acquired (step S137; YES), the process proceeds to step S139. In step S139, the notification unit 413 notifies the smartphone 1 of the entire completion information JB5 together with the job identification information PID, and the process ends.

4. Effects of the Embodiment

As explained above, in the embodiment, the data processing system 100 includes the printer 5 that performs a print job PB, and the second server apparatus 4 that communicates with the smartphone 1 that executes an application program of a social networking service. In addition, the second server apparatus 4 includes the acquisition unit 411 that acquires the print instruction information JA from the social networking service, the job generation unit 412 that generates the print job PB corresponding to the printer 5 based on the print instruction information JA acquired by the acquisition unit 411, the notification unit 413 that notifies the social networking service of the response information JR indicating that the print instruction information JA has been accepted, and job identification information PID for identifying the print job PB generated by the job generation unit 412, the job transmission unit 414 that transmits the print job PB to the printer 5, and the status acquisition unit 415 that acquires the status information JB indicating the execution status of the print job PB, the notification unit 413 notifies the social networking service of the status information JB indicating the execution status of the print job PB acquired by the status acquisition unit 415 and job identification information PID. Therefore, the response information JR and the job identification information PID are notified to the social networking service, so that the user can recognize that the print instruction information JA has been accepted, and the job identification information PID corresponding to the print instruction information JA. In addition, since the status information JB and the job identification information PID are notified to the social networking service, the user can recognize the execution status of the print job PB corresponding to the job identification information PID. Therefore, user convenience can be improved.

In addition, the smartphone 1 displays a user interface (for example, the message screen 600) through the social networking service, and the notification unit 413 transmits, to the social networking service, data for displaying the response information JR and the job identification information PID in association with each other on the user interface. Therefore, since data for displaying the response information JR and the job identification information PID in association with each other on the user interface is transmitted to the social networking service, the user can easily recognize that the print instruction information JA has been accepted, and the job identification information PID corresponding to the print instruction information JA. Therefore, user convenience can be improved.

In addition, the notification unit 413 transmits, to the social networking service, data for displaying the status information JB indicating the execution status of the print job PB and the job identification information PID in association with each other on the user interface (for example, the message screen 600). Therefore, since the status information JB and the job identification information PID are displayed in association with each other on the user interface, the user can easily recognize the execution status of the print job PB corresponding to the job identification information PID. Therefore, user convenience can be improved.

In addition, the status acquisition unit 415 acquires the status information JB indicating the execution status of the print job PB including at least one of the cancellation of the print job PB and the completion of the print job PB, and the notification unit 413 notifies the social networking service of the cancellation of the print job PB or the completion of the print job PB together with the job identification information PID. Therefore, since the notification of the cancellation of the print job PB or the completion of the print job PB together with the job identification information PID is notified to the social networking service, the user can easily recognize the cancellation of the print job PB corresponding to the job identification information PID or the completion of the print job PB. Therefore, user convenience can be improved.

In addition, the notification unit 413 notifies the social networking service of the print instruction information JA for instructing printing of a plurality of sheets in association with one piece of job identification information PID. Therefore, since the print job PB relating to printing on a plurality of sheets can be managed by one piece of the print instruction information JA, the user can easily recognize the print job PB corresponding to the job identification information PID. Therefore, user convenience can be improved.

In addition, the status acquisition unit 415 acquires the remaining amount Q of the printing material consumed by the printer 5 when printing is performed, and when the remaining amount Q of the printing material acquired by the status acquisition unit 415 is equal to or less than the threshold value QS, the notification unit 413 notifies the social networking service that the remaining amount of the printing material is small. Therefore, when the remaining amount Q of the printing material is equal to or less than the threshold value QS, the small remaining amount of the printing material is notified to the social networking service, so that the user can recognize that the remaining amount of the printing material is small. Therefore, when the user is the owner of the printer 5 or when the user is an administrator of the printer 5, user convenience can be improved.

In addition, when notifying the social networking service that the remaining amount of the printing material is small the notification unit 413 makes a notification of guiding purchase of the printing material. Therefore, the guidance of the purchase of the printing material is notified to the social networking service, so that when the user is the owner of the printer 5, or, when the user is an administrator of the printer 5, the user can easily purchase the printing material. Therefore, user convenience can be improved.

In addition, the status acquisition unit 415 determines that the storage time limit of the print job PB has expired when the print job PB has not been completed even after the time limit has elapsed since the job transmission unit 414 transmitted the print job PB to the printer 5, and the notification unit 413 makes a notification that the storage time limit of the print job PB has expired. Therefore, when the print job PB is not completed even after the time limit has elapsed since the print job PB was transmitted to the printer 5, the smartphone 1 is notified that the storage time limit of the print job PB has expired, so that the user can recognize that the storage time limit of the print job PB has expired. Therefore, user convenience can be improved.

In addition, the notification unit 413 accepts, from the social networking service, an inquiry request for inquiring about an execution status of the print job PB corresponding to the job identification information PID, and notifies the social networking service of a response to the inquiry request. Therefore, the user can check the execution status of the print job PB corresponding to the job identification information PID at a desired timing. Therefore, user convenience can be improved.

In addition, the data processing method of the embodiment is performed by the printer 5 that performs the print job PB, and the second server apparatus 4 that communicates with the smartphone 1 that executes an application program of a social networking service. The data processing method includes acquiring the print instruction information JA from the social networking service, generating the print job PB corresponding to the printer 5 based on the print instruction information JA, notifying the social networking service of the response information JR indicating that the print instruction information JA has been accepted and the job identification information PID for identifying the print job PB, transmitting the print job PB to the printer 5, acquiring the status information JB indicating the execution status of the print job PB, and notifying the social networking service of the status information JB indicating the execution status of the print job PB and the job identification information PID. Therefore, the response information JR and the job identification information PID are notified to the social networking service, so that the user can recognize that the print instruction information JA has been accepted, and the job identification information PID corresponding to the print instruction information JA. In addition, since the status information JB and the job identification information PID are notified to the social networking service, the user can recognize the execution status of the print job PB corresponding to the job identification information PID. Therefore, user convenience can be improved.

In addition, the server apparatus of the present embodiment is the second server apparatus 4 that communicates with the printer 5 that performs a print job and the smartphone 1 that executes an application program of a social networking service, and the second server apparatus 4 communicates with the printer 5 that performs the print job PB and the smartphone 1 that executes the application program of the social networking service. In addition, the second server apparatus 4 includes the acquisition unit 411 that acquires the print instruction information JA from the social networking service, the job generation unit 412 that generates the print job PB corresponding to the printer 5 based on the print instruction information JA acquired by the acquisition unit 411, a notification unit 413 that notifies the social networking service of the response information JR indicating that the print instruction information JA has been accepted and the job identification information PID for identifying the print job PB generated by the job generation unit 412, the job transmission unit 414 that transmits the print job PB to the printer 5, and the status acquisition unit 415 that acquires the status information JB indicating an execution status of the print job PB, and the notification unit 413 notifies the social networking service of the status information JB indicating the execution status of the print job PB acquired by the status acquisition unit 415 and the job identification information PID. Therefore, the response information JR and the job identification information PID are notified to the social networking service, so that the user can recognize that the print instruction information JA has been accepted, and the job identification information PID corresponding to the print instruction information JA. In addition, since the status information JB and the job identification information PID are notified to the social networking service, the user can recognize the execution status of the print job PB corresponding to the job identification information PID. Therefore, user convenience can be improved.

5. Other Embodiments

The present disclosure is not limited to the configuration of the above-described embodiment, and can be implemented in various modes without departing from the gist thereof. For example, in the above embodiment, the "terminal device" is the smartphone 1, but the embodiment of the present disclosure is not limited to this. The "terminal device" may include a display unit and a controller. For example, the "terminal device" may be a personal digital assistant (PDA) terminal, or a tablet personal computer. In addition, the "terminal device" may be a personal computer.

In addition, in the above embodiment, the data processing system 100 includes the smartphone 1, the SNS server apparatus 2, the first server apparatus 3, the second server apparatus 4, and the printer 5, but the embodiment of the present disclosure are not limited to this. The data processing system 100 may include the smartphone 1, the SNS server apparatus 2, the second server apparatus 4, and the printer 5. For example, the second server apparatus 4 may have the function of the first server apparatus 3 and the function of the second server apparatus 4.

In addition, in the above embodiment, although the configuration in which the printer 5 is coupled to the second server apparatus 4 by wire is illustrated, but the embodiment of the present disclosure are not limited to this. The printer 5 may be configured to be wirelessly coupled to the second server apparatus 4.

In the above embodiment, a case where the print instruction information JA for instructing printing on a plurality of sheets is associated with one piece of job identification information PID is described, but the embodiment of the present disclosure are not limited to this. Each piece of print instruction information JA for instructing printing on one sheet may be associated with one piece of job identification information PID. In this case, the user can reliably manage the printing status for printing on one sheet.

In addition, at least part of each functional block shown in FIG. 2 may be implemented by hardware, or may be implemented by the cooperation of hardware and software. The embodiment of the present disclosure is not limited to a configuration in which independent hardware resources are disposed as shown in the drawings. In addition, the control program executed by the second controller 41 of the second server apparatus 4 may be stored in the HDD. In addition, the configuration may be such that the control program stored in the external device is acquired via the second communication unit 42, and executed.

In addition, the processing unit of the flowchart in FIGS. 4 and 5 is divided in accordance with the main processing contents in order to make the processing of the second controller 41 of the second server apparatus 4 easier to understand. The embodiment is not limited by the method and the name of division of the processing unit shown in the flowchart in FIGS. 4 and 5. In addition, the processing by the second controller 41 can be divided into more processing units depending on the processing contents, or can be divided such that one processing unit includes more processing. In addition, the processing order of the above flowchart is not limited to the illustrated example.

In addition, the data processing method of the second controller 41 of the second server apparatus 4 can be performed by causing a computer provided in the second controller 41 of the second server apparatus 4 to execute a control program corresponding to the data processing method of the second controller 41 of the second server apparatus 4. In addition, the control program can also be recorded on a recording medium recorded so as to be readable by a computer. As the recording medium, a magnetic or optical recording medium or a semiconductor memory device can be used. Specifically, examples of the recording medium include a portable recording medium such as a flexible disk, a compact disk read only memory (CD-ROM), a digital versatile disc (DVD), a Blu-ray (registered trademark) disc, a magneto-optical disk, a flash memory, or a card type recording medium, and a fixed type medium. In addition, the recording medium may be a nonvolatile storage device such as a RAM, a ROM, of an HDD, which is an internal storage device included in the second server apparatus 4. In addition, the printer 5 is not limited to an ink jet printer that prints an image using ink, but may be a printer that prints an image using toner.

What is claimed is:

1. A data processing system comprising: a server apparatus that communicates with a printing apparatus that performs a print job and a terminal device that executes an application program of a social networking service, wherein the server apparatus includes
an acquisition unit that acquires a print instruction from the social networking service,
a job generation unit that generates a print job corresponding to the printing apparatus based on the print instruction acquired by the acquisition unit,
a notification unit that notifies the social networking service of a response indicating that the print instruction was accepted and job identification information for identifying the print job generated by the job generation unit,
a job transmission unit that transmits the print job to the printing apparatus, and a status acquisition unit that acquires an execution status of the print job, and wherein the notification unit notifies the social networking service of the execution status of the print job acquired by the status acquisition unit and the job identification information.

2. The data processing system according to claim 1, wherein the terminal device displays a user interface through the social networking service, and wherein the notification unit transmits, to the social networking service, data for displaying the response and the job identification information in association with each other on the user interface.

3. The data processing system according to claim 2, wherein the notification unit transmits, to the social networking service, data for displaying an execution status of the print job and the job identification information in association with each other on the user interface.

4. The data processing system according to claim 1, wherein the status acquisition unit acquires an execution status of the print job including at least one of a cancellation of the print job and completion of the print job, and wherein the notification unit notifies the social networking service of the cancellation of the print job or the completion of the print job together with the job identification information.

5. The data processing system according to claim 1, wherein the notification unit notifies the social networking service of the print instruction for instructing printing on a plurality of sheets in association with one piece of the job identification information.

6. The data processing system according to claim 1, wherein the status acquisition unit acquires a remaining amount of a printing material consumed by the printing apparatus when printing is performed, and wherein when the remaining amount of the printing material acquired by the status acquisition unit is equal to or less than a threshold value, the notification unit notifies the social networking service that the remaining amount of the printing material is small.

7. The data processing system according to claim 6, wherein when notifying the social networking service that the remaining amount of the printing material is small, the notification unit makes a notification of guiding purchase of the printing material.

8. The data processing system according to claim 1, wherein when the print job is not completed even after a time limit elapsed since the job transmission unit transmitted the print job to the printing apparatus, the status acquisition unit determines that a storage time limit of the print job expired, and wherein the notification unit makes a notification that the storage time limit of the print job expired.

9. The data processing system according to claim 1, wherein the notification unit accepts, from the social networking service, an inquiry request for inquiring about an execution status of the print job corresponding to the job identification information, and notifies the social networking service of a response to the inquiry request.

10. A data processing method performed by a server apparatus that communicates with a printing apparatus that performs a print job and a terminal device that executes an application program of a social networking service, the method comprising:

acquiring a print instruction from the social networking service;

generating a print job corresponding to the printing apparatus based on the print instruction;

notifying the social networking service of a response indicating that the print instruction was accepted and job identification information for identifying the print job;

transmitting the print job to the printing apparatus;

acquiring an execution status of the print job; and notifying the social networking service of the execution status of the print job and the job identification information.

11. A server apparatus that communicates with a printing apparatus that performs a print job and a terminal device that executes an application program of a social networking service, the server apparatus comprising:

an acquisition unit that acquires a print instruction from the social networking service;

a job generation unit that generates a print job corresponding to the printing apparatus based on the print instruction acquired by the acquisition unit;

a notification unit that notifies the social networking service of a response indicating that the print instruction was accepted and job identification information for identifying the print job generated by the job generation unit;

a job transmission unit that transmits the print job to the printing apparatus; and a status acquisition unit that acquires an execution status of the print job, and wherein the notification unit notifies the social networking service of the execution status of the print job acquired by the status acquisition unit and the job identification information.

\* \* \* \* \*